United States Patent

Ravichandran

[11] Patent Number: 5,966,537
[45] Date of Patent: Oct. 12, 1999

[54] METHOD AND APPARATUS FOR DYNAMICALLY OPTIMIZING AN EXECUTABLE COMPUTER PROGRAM USING INPUT DATA

[75] Inventor: Hari K. Ravichandran, Sunnyvale, Calif.

[73] Assignee: Sun Microsystems, Inc., Palo Alto, Calif.

[21] Appl. No.: 08/864,655

[22] Filed: May 28, 1997

[51] Int. Cl.$^6$ .................................................. G06F 9/45
[52] U.S. Cl. ..................... 395/709; 395/708; 395/707; 395/710
[58] Field of Search ...................... 395/183.11, 183.14, 395/702, 706, 708, 709, 182.06, 705, 707, 710; 364/736, 736.5, 761, 149.01, 133

[56] References Cited

U.S. PATENT DOCUMENTS

| | | | |
|---|---|---|---|
| 4,656,582 | 4/1987 | Chaitin et al. | 395/707 |
| 5,134,705 | 7/1992 | Smith et al. | 395/500 |
| 5,151,991 | 9/1992 | Iwasawa et al. | 395/706 |
| 5,291,497 | 3/1994 | Ulrich et al. | 395/183.14 |
| 5,539,907 | 7/1996 | Srivastva et al. | 395/705 |
| 5,590,331 | 12/1996 | Lewis et al. | 395/708 |
| 5,649,135 | 7/1997 | Pechanek et al. | 395/376 |
| 5,758,061 | 5/1998 | Plum | 395/183.11 |
| 5,805,895 | 9/1998 | Breternitz, Jr. et al. | 395/709 |
| 5,815,712 | 9/1998 | Bristor et al. | 395/701 |
| 5,822,511 | 10/1998 | Kashyap et al. | 395/182.06 |

OTHER PUBLICATIONS

H.A. Rizvi, et al.; "Execution–Driven Simulation of a Superscalar Processor"; IEEE; 1994; pp. 185–194.

Wayne Yamamoto, et al.; "Performance Estimation of Multistreamed, Superscalar Processors"; IEEE; 1994; pp. 195–204.

Chatterjee et al., "Optimal evaluation of array expressions on massively parallel machines", ACM Trans. Prog. Lang. Sys. vo. 17, pp. 123–156, Jan. 1995.

(List continued on next page.)

Primary Examiner—Tariq R. Hafiz
Assistant Examiner—Anil Khatri
Attorney, Agent, or Firm—Sierra Patent Group, Ltd.

[57] ABSTRACT

The present invention provides a method and apparatus for using input data to optimize a computer program. Initially, the computer program is divided into one or more logical units of code. Next, a CPU simulator is used to simulate execution of each logical unit using the input data. The output from the simulation is used to generate a first optimization metric value and corresponding state information for each logical unit. In one embodiment, the first optimization metric value and corresponding state information are stored in a first optimization vector. Using well known optimization techniques, the instructions within each logical unit are optimized iteratively until additional optimizations would result in very small incremental performance improvements. A second simulation is performed using the same input data except that this time the optimized logical units are used. This second simulation is used to measure how much the optimizer has improved the code. The output from the second simulation is used to generate a second optimization metric value and corresponding state information. The degree of optimization is determined by determining the difference between the first optimization metric value and the second optimization metric value for the sum of the logical units. If the difference is less than a predetermined threshold value, additional optimization iterations would provide little code improvement and thus the optimization is complete. However, if the difference is greater than or equal to the predetermined threshold value, additional optimizations would likely improve performance. In the latter case, the present invention would repeat the optimization process described above.

20 Claims, 4 Drawing Sheets

OTHER PUBLICATIONS

Martin et al., "Exploiting dead value information", IEEE pp. 125–135, 1997.

Dean et al., "Vortex an optimization compiler for object oriented languages", OOPSLA ACM, pp. 83–100, 1996.

Cole, "Optimization of dynamic query evaluation plans", SIGMOG ACM, pp. 150–160, May 1994.

Holzle et al., "Optimizing dynamically dispatched calls with run time feed back", ACM SIGPLAN, pp. 326–336, Jun. 1994.

Agesen et al, "Type feed vs concrete type interface a comaprision of optimization techniques for object oriented languages", OPPSLA ACM, pp. 91–101, 1995.

FIG. 3

| 302 | 304 | 306 | 308 | 310 | 312 | 314 |
|---|---|---|---|---|---|---|
| BASIC BLOCK IDENTIFIER | FREQUENCY INDEX ASSOCIATED WITH BASIC BLOCK | LIVE REGISTER AND ADDRESS REGISTER LISTS | CODE STABILITY INDICATOR | CODE STATE DEFINITION FOR MOST CURRENT RUN | CROSS BLOCK OPTIMIZER OPTIONS | OPTIMIZATION METRIC VALUE |

300

METHOD AND APPARATUS FOR DYNAMICALLY OPTIMIZING AN EXECUTABLE COMPUTER PROGRAM USING INPUT DATA

RELATED APPLICATIONS

This application is related to U.S. application Ser. No. 08/865,335, filed May 28, 1997, entitled "METHOD AND APPARATUS FOR CONVERTING EXECUTABLE COMPUTER PROGRAMS IN A HETEROGENEOUS COMPUTING ENVIRONMENT", and naming Hari Ravichandran as inventor, and U.S. application Ser. No. 08/864,247, filed May 28, 1997, entitled "METHOD AND APPARATUS FOR GENERATING AN OPTIMIZED TARGET EXECUTABLE COMPUTER PROGRAM USING AN OPTMIZED SOURCE EXECUTABLE", and naming Hari Ravichandran as inventor, both of which are assigned to the assignee of the present invention and are herein incorporated, in their entirety, by reference.

FIELD OF THE INVENTION

The present invention relates to computer compilers and interpreters. In particular, this invention relates to a technique for optimizing an executable computer program using input data.

BACKGROUND OF THE INVENTION

In most cases, programmers write computer applications in high level languages, such as JAVA[1] or C++, and rely on sophisticated optimizing compilers to convert the high level code into an efficient executable computer program. Optimizing compilers have replaced the time consuming and commercially unfeasible task of handcoding applications in low level assembly or machine-code for maximum efficiency. Instead, an optimizer portion of the compiler performs transformations on the code designed to improve execution times and utilize computer resources more efficiently. Accordingly, some of the code transformations are based on the structure of the code and not related to the target processor used for execution. Other types of transformations improve the code by utilizing specific features available on the target processor such as registers, pipeline structures and other hardware features.

1. The Network Is the Computer, Sun, the Sun logo, Sun Microsystems, Solaris, Ultra and Java are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd.

Unfortunately, most optimizes available today only estimate which portions of the program will benefit most from the optimization routines before actual execution. These optimizers analyze the application code in a static state and without any input data. Graphing theory and complex data flow analysis are used at compile time to determine which portions of the code might be executed most frequently at execution time. If these determinations are not correct, frequently executed portions of the code or "hot spots" will not be optimized and the code will run less efficiently. Also, if the application is unusual or behaves in an atypical manner these techniques may also fail to optimize the code effectively.

The current state of optimizing compilers must be significantly improved as the compiler becomes a more integral part of the processor performance. On many pipelined multiple issue processor architectures, the performance of hardware based instruction schedulers have been enhanced using sophisticated optimizing compilers which generate an instruction stream which further exploits the underlying hardware. Unfortunately, these compilers show limited results optimizing computer programs using the current static optimization techniques. In practice, the typical optimizer has difficulty fully optimizing a computer program because the input data and actual runtime characteristics of the computer program are unknown at compile time. Consequently, the optimizer may only increase the performance of a computer program marginally. For example, a very-long-instruction-word (VLIW) computer relies primarily on an optimizing compiler to generate binaries capable of exploiting the VLIW processor's multiple issue capabilities. If the run-time characteristics of a particular computer program are complex, the VLIW optimizing compiler will not be able to predict the run time characteristics of the program and exploit all the processor's features adequately.

Optimizers are also important when comparing processor's based on industry standard benchmarks such as SPECint95, SPECfp95, and TPCC/CB. These standard benchmarks are used to compare different processors based upon how quickly each processor executes the given benchmark program. An inherently powerful processor can appear relatively slow if the optimizing compiler does not optimize the code properly. As a result, the apparent throughput on a processor may be significantly less than a computer manufacturer expects.

What is needed is a dynamic optimizing compiler which uses input data to profile a computer application in a systematic manner suitable for producing a highly optimized executable. These techniques can be used to optimize executables on a wide variety of platforms.

SUMMARY OF THE INVENTION

According to principles of the invention, a method and apparatus for using input data to optimize a computer program for execution on a target computer is provided. Initially, the computer program is divided into one or more logical units of code. Next, a CPU simulator is used to simulate execution of each logical unit using the input data. The output from the simulation is used to generate a first optimization metric value and corresponding state information for each logical unit. In one embodiment, the first optimization metric value and corresponding state information are stored in a first optimization vector. Using well known optimization techniques, the instructions within each logical unit are optimized iteratively using the first optimization metric value and corresponding state information. The iterations continue until additional optimizations would result in very small incremental performance improvements and a diminishing return in performance compared with processing expended. A second simulation is performed using the same input data except that this time the optimized logical units are used. This second simulation is used to measure how much the optimizer has improved the code. The output from the second simulation is used to generate a second optimization metric value and corresponding state information. The degree of optimization is determined by determining the difference between the first optimization metric value and the second optimization metric value. If the difference is less than a predetermined threshold value, additional optimization iterations would provide little code improvement and thus the optimization is complete. However, if the difference is greater than or equal to the predetermined threshold value, additional optimizations would likely improve performance. In the latter case, the present invention would repeat the optimization process described above.

BRIEF DESCRIPTION OF THE DRAWINGS

FIG. 3 is a block diagram which illustrates the parameter values stored in an optimization vector.

DETAILED DESCRIPTION

Figure 1:
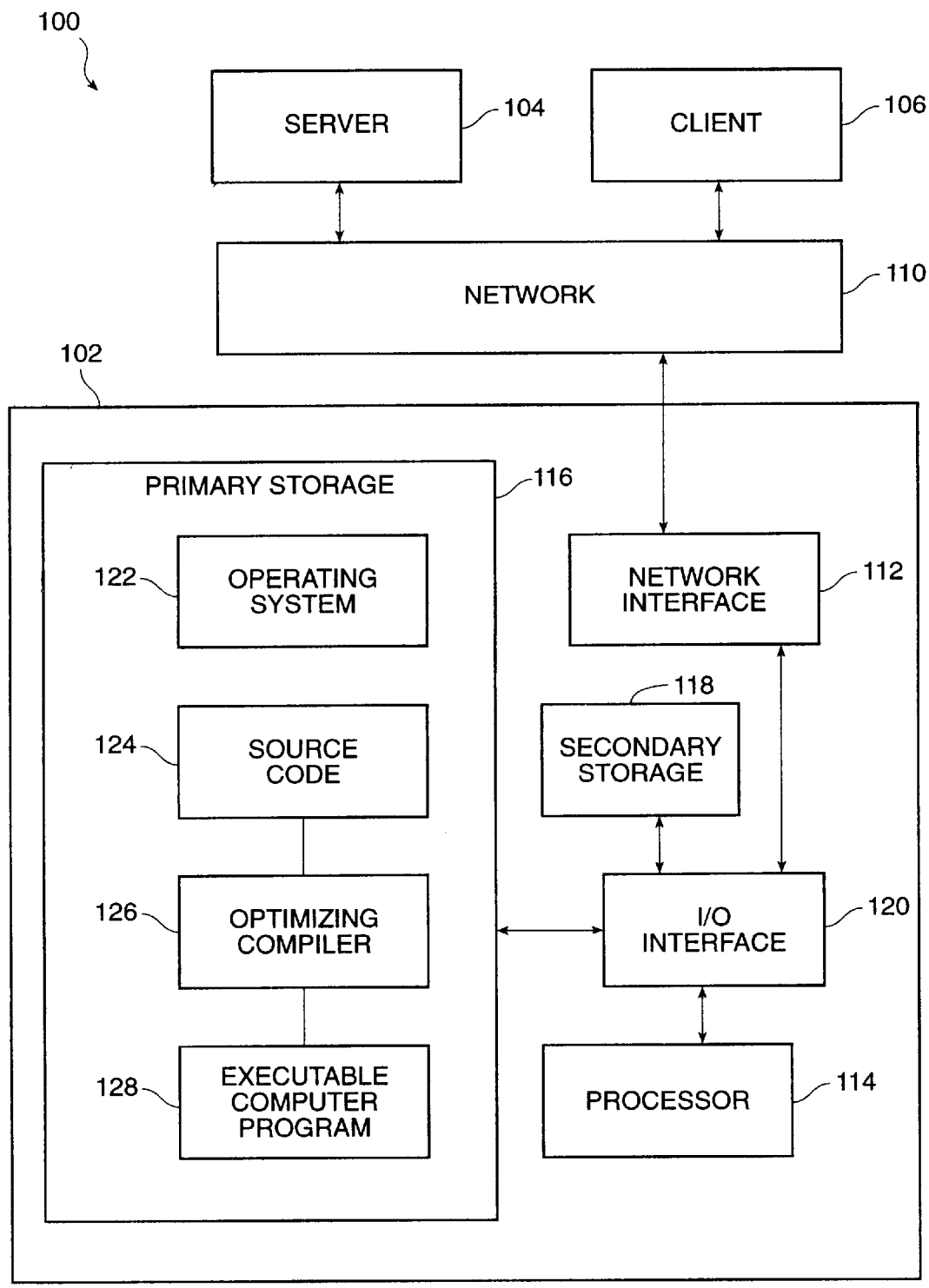
FIG. 1 illustrates a computer network for practicing one embodiment of the present invention.

FIG. 1 illustrates a computer network 100 for practicing one embodiment of the present invention. Computer network 100 includes server computer systems 102 and 104 configured to communicate with a client computer system 106 over a network 110. Preferably, the client and server computer systems coupled to this network transmit information utilizing the TCP/IP protocol. Other network protocols such as SNA, X.25, Novell Netware[1], Vines, or Apple-Talk could also be used to provide similar client-server communication capabilities.

1. Network is a registered trademark of Novell, Inc. in the United States and other countries.

Server 102 includes a network interface 112, a processor 114, a primary storage 116, a secondary storage 118, and an I/O (input output) interface 120 which facilitates communication between these aforementioned elements. Network interface 112 couples server 102 to network 110 and facilitates communication between server 102 and other computers on the network.

Typically, processor 114 on server 102 fetches computer instructions from primary storage 116 through I/O interface 120. After retrieving these instructions, processor 114 executes these computer instructions. Executing these computer instructions enables processor 114 to retrieve data or write data to primary storage 116, secondary storage 118, display information on one or more computer display devices (not shown), receive command signals from one or more input devices (not shown), or retrieve data or write data to other computer systems coupled to network 110 such as server 104, and client 106. Those skilled in the art will also understand that primary storage 116 and secondary storage 118 can include any type of computer storage including, without limitation, randomly accessible memory (RAM), read-only-memory (ROM), application specific integrated circuits (ASIC) and storage devices which include magnetic and optical storage media such as CD-ROM. In one embodiment, processor 114 can be any of the SPARC compatible processors, UltraSPARC compatible processors, or Java compatible processors available from Sun Microsystems, Inc. of Mountain View, Calif. Alternatively, processor 114 can be based on the PowerPC processor available from Apple, Inc. of Cupertino, Calif., or any of the Pentium or x86 compatible processors available from the Intel Corporation or other corporations such as AMD, and Cyrix.

Primary storage 116 includes an operating system 122 for managing computer resources. In one embodiment, this operating system is the Solaris operating system or any other multitasking, multiuser operating system with support for object oriented programming languages such as the Java programming language or high level programming languages such as C. Also included in primary storage 116 is a source code 124, such as the source code of a Java application, and an optimizing compiler 126 for generating an executable computer programs 128.

Figure 2:
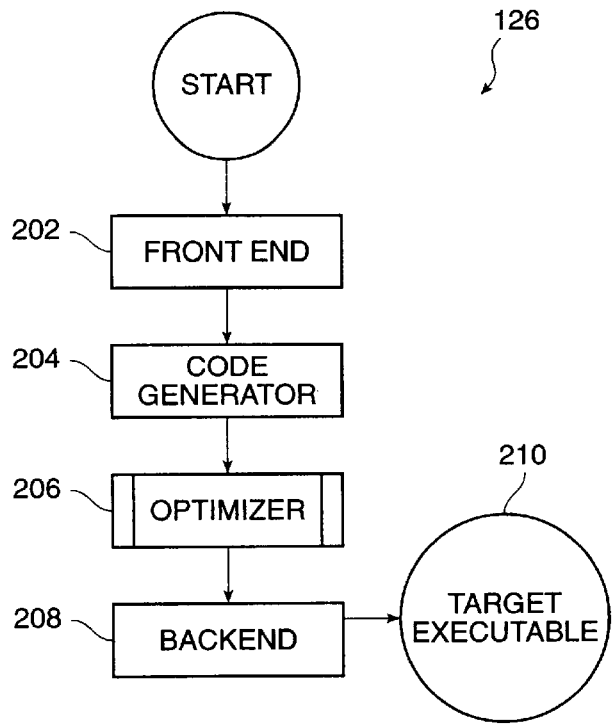
FIG. 2 is a flowchart illustrating the overall processing performed by an optimizing compiler designed in accordance with one embodiment of the present invention.

FIG. 2 is a flowchart illustrating the overall processing performed by an optimizing compiler 126 designed in accordance with one embodiment of the present invention. Optimizing compiler 126 typically contains a front end 202, a code generator 204, an optimizer 206 and a backend 208. First, the source code for a computer program is generated by a user and provided to front end 202 of the compiler where various pre-processing functions are performed. Next, the code is provided to the code generator 204 which generates a set of instructions expressed in an intermediate code which is semantically equivalent to the source code. Typically, the intermediate code is expressed in a machine-independent format.

In accordance with one embodiment of the present invention, code optimizer 206 accepts this intermediate instruction set and performs various transformations to schedule the instruction set in a faster and more efficient manner. Some of these optimizations are concerned with improving the logic of the code and some of the optimizations are concerned with improving the code based upon the target processor used to execute the code Details on one embodiment for implementing the present invention is discussed in further detail below.

Next, backend 208 accepts the optimized intermediate code and generates a target executable 210 which includes a set of machine instructions in binary format which can be executed on a specific target machine such as SPARC, Intel, PowerPC, or MIPS. Each machine instruction includes an operation code (opcode) portion and an operand portion containing one or more operands. The opcode portion of the machine instruction instructs the target machine to execute specific functions. The operand portion of the instruction is used to locate data stored in a combination of registers or memory available during execution.

Embodiments of the present invention provide a novel technique for optimizing a computer program using a CPU simulator and input data. A series of optimization vectors are used to store information and drive the optimization process. According, a brief discussion of the optimization vector and the parameters stored within it is useful in understanding the present invention and the overall optimization process.

Referring to FIG. 3, a block diagram indicates the typical optimization metrics stored in an optimization vector 300 and associated with each basic block. First, a basic block identifier 302 is stored in optimization vector 300 to quickly identify the basic block currently being optimized. In one embodiment of the present invention, the optimization vector information is stored as a linked list. Basic block identifiers 302 in this linked list contain a value generated using the memory offsets of each basic block as an input value to a quadratic hashing function. By hashing values in this manner, each basic block is located more quickly and accurately than possible in non-hashed search techniques. As an alternative to a linked list, the optimization vectors could be stored in a large hashing table having N entries.

In another portion of optimization vector 300, frequency index 304 provides a metric indicating how many instructions are executed within the particular basic block. A large value in frequency index 304 typically means the associated basic block contains a "hot spot" within the code and should be the focus of the optimization process. Those skilled in the art will understand that the frequency index 304 metric is typically larger than the number of instructions in a basic block because many of the instructions are executed repeatedly. In one embodiment, each basic block is optimized in descending order based upon frequency index 304. Typically, basic block identifier 302 is used to organize the sequence in which each basic block is analyzed and optimized. Unlike prior solutions, the present invention uses a CPU simulator to determine which areas of the program actually are executed most frequently. Consequently, the present invention operates more reliably and more efficiently than prior art systems.

Referring to FIG. 3, a live register list 306 provides the list of live registers and address registers used in the current version of the optimized basic block. Those skilled in the art understand that address registers are typically used in processors where load instructions can only use registers and can not access memory directly. The address registers are typically reserved for load instructions. Accordingly, keeping a list of the live registers and address registers indicates how efficiently the registers on the processor are being used. It also provides the optimizer with an indication of how much register pressure the current basic block contributes to the overall execution profile. Optimization techniques concerned with utilizing registers more efficiently will use live register list 306 during the optimization process A code stability indicator 308 in optimization vector 300 indicates whether local code optimization schemes have been exhausted and no more code movement is going to occur. Before optimization schemes are applied, the initial value associated with stability indicator 308 indicates that the code is unstable and that additional code optimizations can be made to the basic block. At this stage, the code is considered unstable because each local optimization typically rearranges or modifies the existing code. Eventually, when no more local code optimizations can be made, code stability indicator 308 indicates that the code is stable and that local optimizations for the particular basic block have been exhausted. Details on determining when code in the basic block is unstable or stable is discussed in further detail below.

In yet another portion of optimization vector 300, a state definition 310 is used to store information concerning the state of the code in a given basic block. This state information typically includes detailed information on the registers used in the basic block and the dependencies on these registers between instructions and between different basic blocks. The state information in state definition 310 is typically updated with modifications to the code each time an optimization transformation is applied to a particular basic block. In one embodiment, a pointer in state definition 310 indicates where the state information is located elsewhere in memory. Alternatively, state information could actually be contained within the area reserved for state definition 310. Details on the actual state information associated with state definition 310 are discussed in further detail below.

Another portion of optimization vector 300 is a cross block optimization option 312 which is used to drive optimizations which take place between basic blocks of instructions within the program. Accordingly, cross block optimizer option 312 includes a parameter which determines how many basic blocks outside the current basic block should be analyzed for cross block types of optimizations.

The next portion of optimization vector 300 is a optimization metric value 314 used to store an optimization metric value associated with a particular basic block. In one embodiment, the optimization metric value 314 is the weighted product of the number of instructions executed in the basic block and the clock cycles per instruction (CPI) used to execute these instructions. Because the CPI is generated for each basic block, analysis is performed at a relatively high degree of granularity which in turn provides more accurate results. The weight attributed to these two parameters (number of instructions executed in a basic block and CPI) is user defined and depends on the empirical results generated by the specific application or use. These two values are obtained primarily from simulation results performed by a CPU simulator. This value is important in determining the incremental improvement obtained in the most recent optimization and moreover when the optimization process is complete. Details on how the optimization metric value is utilized will be discussed in the entirety later herein.

Figure 4:
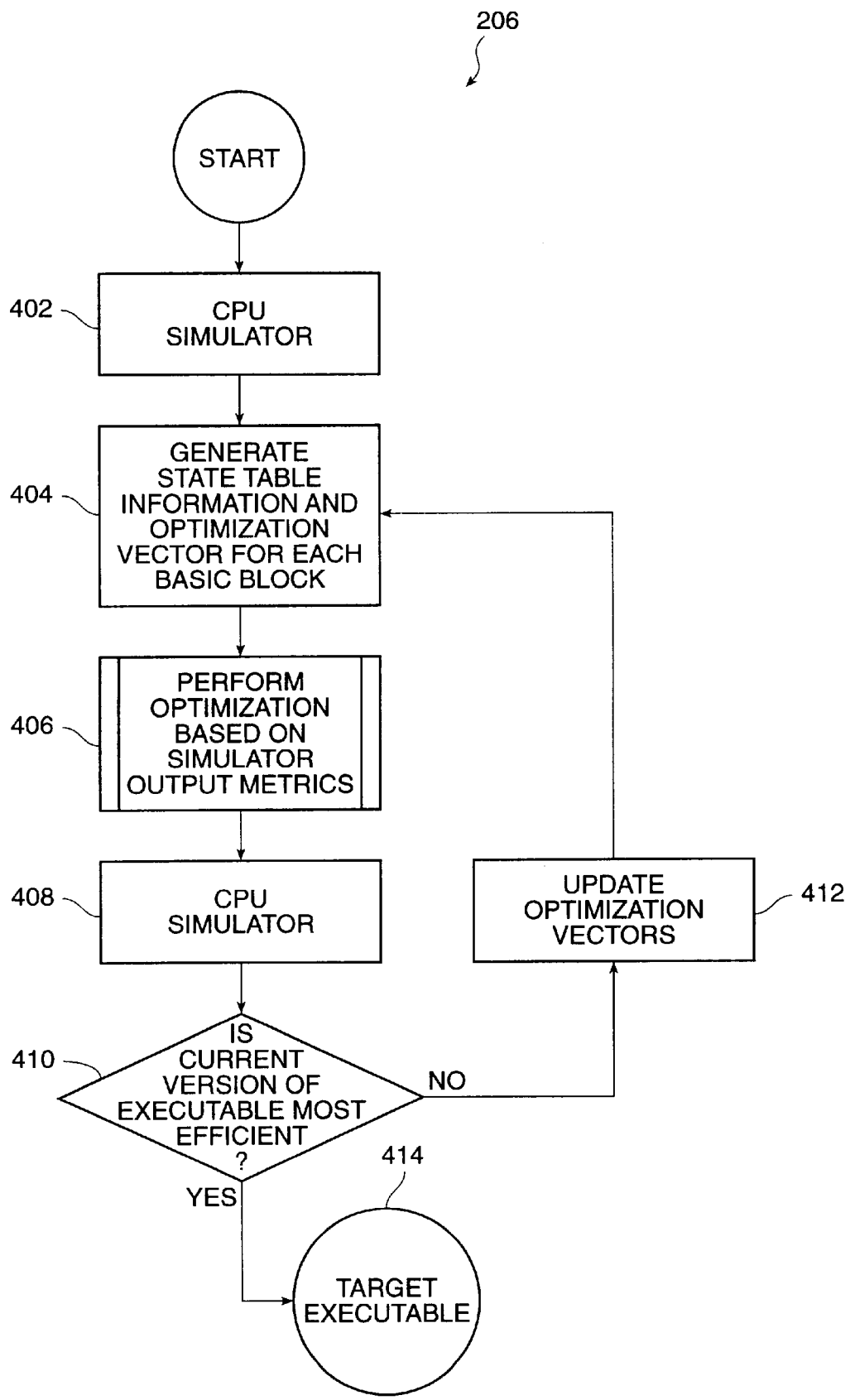
FIG. 4 is flowchart illustrating the detailed steps associated with an optimizer designed in accordance with the present invention.

Referring to FIG. 4, a flowchart diagram of optimizer 206 (FIG. 2) provides detailed steps associated with one embodiment of the present invention. Initially, this process assumes that a compiler has generated an initial set of architecturally neutral instructions which are similar to the underlying instructions used by the CPU used during execution. Alternatively, these initial instructions could also be a set of instructions which could be executed directly on the underlying CPU. Accordingly, the initial instruction set being processed could contain either the former architecturally neutral or the latter architecturally specific instruction types.

Referring to FIG. 4, at step 402 a cycle accurate CPU simulator receives an initial set of instructions from code generator 204 (FIG. 2). These instructions are generally divided into one or more logical units of code to simplify the optimization process later on. In one embodiment, these logical units are basic blocks of instructions having only one entrance instruction and one exit instruction. The cycle accurate CPU simulator uses an input data to simulate the execution of these instructions on a target processor. The simulation indicates which instructions will not be executed and the frequency at which the instructions are executed given the particular input data. Moreover, the simulation results also indicate how much time or instruction cycles each instruction will take to execute. Unlike other optimizers, the present invention generates actual execution information based upon specific input information as it relates to a particular processor. Knowing which instructions are actually executed in a program improves data flow analysis and the optimization process on a whole. Information on generating a CPU simulator is discussed in "Execution Driven Simulation of a Superscalar Processor", H. A. Rizvi, et. al, Rice University, 27th Annual Hawaii International Conference on System Sciences, 1994 and "Performance Estimation of Multistreamed, Superscalar Processors", Wayne Yamamoto, et. al, University of Santa Barbara, 27 Annual Hawaii International Conference on System Sciences, 1994.

At step 404 (FIG. 4) global code dependencies are determined and stored in a state table for later reference during the optimization process. Typically, each basic block within the program has an entry in the state table which stores information on the code in a particular basic block. For example, the state table includes extensive information on the registers used within the basic block. This includes whether certain registers within the basic block are "dead" or "live" and the register pressure associated with the operations within the basic block. Those skilled in the art will understand that a "live" register has stored a value which is going to be used by a subsequent instruction while "dead" indicates that a particular register is no longer required by a subsequent register in the basic block.

The state table entries generated at step 404 also include the state of dependencies of instructions between basic blocks. In one embodiment, these dependencies are determined using a variation on the Tomosula Algorithm for determining instruction dependencies as described in "Computer Architecture: Pipeline and Processor Design", Michael Flynn, Ch. 7, Jones and Bartlett Publishers, 1995 and is herein incorporated by reference in the entirety. Accordingly, these dependencies are categorized within the state table as being either essential, order, or output.

Further, the state table entries generated at step 404 also include information on external or internal references made within the basic block to procedures or objects. The internal references refers to a portion of code within the current object while an external reference refers to a portion of code not within the current object not being analyzed and thus requires linking or loading a library or external object. In most cases, not loading or linking the externally or internally referenced code is not fatal to the optimization process but will reduce the accuracy of the process and potentially the degree of optimization. Those skilled in the art understand that the above entries included in the state table are only exemplary and should not be construed to limit the amount of information stored. In particular, the state table could potentially include any and all information derived from a CPU simulator which simulates the execution of a computer program given input data.

Step 404 also generates an optimization vector, such as optimization vector 300 in FIG. 3, for each basic block which stores a number of optimization parameters used iteratively during the optimization process. One element in the optimization vector includes the optimization metric parameter. As previously mentioned, this parameter is the weighted product of the number of instructions executed in the basic block and the clock cycles per instruction (CPI) used to execute these instructions. It is an important parameter in evaluating the efficiency of each optimization iteration. Potentially, the optimization metric parameter and other parameters change as each basic block is optimized.

Next, processing transfers from step 404 to step 406 where optimizations of each basic block are performed using the CPU simulator output information. The most recent optimization vector is used to optimize the current executable computer program and achieve a new associated execution efficiency. Typical optimizations include: invariance optimization; redundant code optimizations; global code motion; local code motion; loop unrolling; basic block boundary detection; and "dead code" removal optimizations. The local optimizations are repeated on each basic block until a predetermined level of optimization is converged upon. Methods associated with determining this convergence point are discussed in more detail below with respect to FIG. 5. With regards to information on optimization techniques see, "Compilers: Principles, Techniques, and Tools", Chapter 10, Alfred V. Aho, Ravi Sethi, Jeffrey D. Ullman, Addison-Wesley, 1988.

At step 408, a second simulation is performed using CPU simulator 408 and the same input data except that this time the optimized basic blocks of code are used. This second simulation is used to measure how much the optimizer has improved the code. In one embodiment, the output from the first simulation at step 408 is used to generate a second optimization metric value and corresponding state information for each basic block. The degree of optimization is determined by taking the difference between the first optimization metric value and the second optimization metric value.

Next, decision step 410 determines if the current computer program has been optimized most efficiently and the optimization process is complete. This step also uses a convergence technique similar to the one discussed above with respect to basic block optimizations. In particular, decision step 410 determines if another iteration of optimization should be performed on the computer program by analyzing the change optimization metric values as a result of the most recent optimizations. As previously discussed, this information is typically located in the optimization vector associated with each basic block. If the change in the optimization metric value is smaller than the predetermined minimum threshold, processing transfers from decision step 410 to step 414 because additional optimization iterations would not likely produce significant results. In accordance with the present invention, this would indicate that the optimization for the program is complete. Alternatively, if the change in optimization metric value is greater than or equal to a predetermined minimum threshold, additional optimizations may increase the performance of the computer program and justify the additional intervening processing. Accordingly, processing would transfer to step 412 where the original and optimized optimization vectors would be swapped. Processing would then transfer back to step 404 where state information and optimization vector information is generated. Steps 402–410 are repeated until the optimization criteria discussed above is met.

Figure 5:
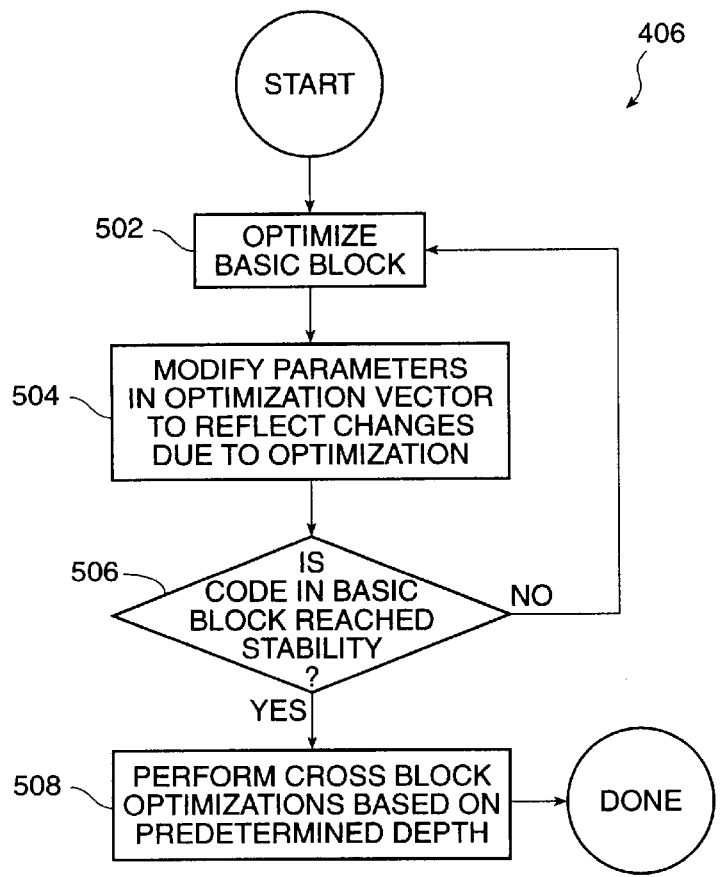
FIG. 5 is a flowchart which illustrates in more detail the steps used to perform optimizations on a basic block of instructions.

Referring to FIG. 5, a flowchart provides a more detailed description of the steps used to perform local optimizations on a given basic block of instructions at step 406 (FIG. 4). Essentially, each basic block in a computer program is optimized individually before the computer program is profiled using the CPU simulator. Initially, each basic block is assumed to be in an "unstable" state since optimizations or transformations on the code invariably delete or rearrange the basic block instructions. To indicate this, the initial optimization vector for each basic block indicates the basic block is unstable. When the optimization on the basic block is complete, the stability flag indicates a "stable" state.

In FIG. 5, step 502 performs a group of optimization techniques well known in the art to the basic block code section. Parameter information contained with the optimization vector drives these optimization transformations on each basic block. In one embodiment, the optimization techniques include invariance optimization, redundant code optimizations, global code motion, local code motion, loop unrolling, basic block boundary detection, and "dead code" removal optimizations.

Ideally, each transformation deletes or moves code which results in reducing the CPI (clock cycles per instructions) and overall execution time. Step 504 modifies parameters in the optimization vector to reflect changes due to these optimization transformations. Typically, this involves reducing the optimization metric value by some amount with each iteration.

Referring to FIG. 5, decision step 504 determines if another iteration of optimization should be performed on the basic block by analyzing the estimated change in CPI and reduction in execution time as a result of the most recent optimizations. If the change in CPI is greater than or equal to a predetermined minimum threshold, additional optimizations may increase the performance of this particular basic block and justify the additional intervening processing. In this case, the basic block remains unstable and the corresponding stability entry in the optimization vector is not changed. Further, additional optimizations are performed on this basic block. Alternatively, if the change in CPI is smaller than the predetermined minimum threshold, processing transfers from decision step 504 to step 506 because additional optimization iterations would not likely produce significant results. In the latter case, the basic block is deemed stable and the corresponding stability entry in the optimization vector is set to indicate such a condition. This would also indicate that optimization for the particular basic block is complete.

Processing then transfers from decision step 506 to step 508 where cross block optimizations are performed to take advantage of specific instructions located in other basic blocks in the computer program. In one embodiment, cross block optimizations are useful in a superscalar architecture computer, such as SPARC, where two instructions have a long execution latency and a third independent instruction can be executed between them. Cross block optimization heuristics search through a number of adjacent basic blocks for instructions which can be executed out-of-order between instructions with a long execution latency. Unlike hardware based techniques for performing out-of-order execution, this method does not require special on-chip buffers to process more basic blocks and to re-order instruction results once they complete. Instead, the present invention performs all these calculations in software.

The present invention offers several advantages in compiler optimization which were previously unavailable in the art. Unlike existing techniques, each optimization vector is generated using actual input data for each executable computer program. In the past, the user estimated the run-time characteristics of the program at compile time and provided a single optimization vector used for each basic block in the program. Instead, the present invention actually simulates the runtime characteristics of the program before run time. This simplifies data flow analysis and makes most optimization techniques more efficient.

Another advantage of the present invention is the relative ease of use in which a user can generate an optimized executable. In the past, the user was required to select a predetermined optimization vector for use by the compiler. This often required the user to analyze the type of code being used in the computer program and also adjust various input parameters to the optimizer accordingly. Using the present invention, the CPU simulator provides an initial optimization vector and then iteratively modifies it based on data input drive simulations. This makes the present invention accurate and yet obviates the need for complex decision making initiated by the user.

This technique is also advantageous because the optimization techniques used by the optimizer automatically shift with the type of executable program being executed. In the past, some optimizers performed transformations found statistically useful in a particular class of executable programs (i.e. graphic intensive, floating point intensive, highly parallelized). Often, existing optimizers would have limited improvement in a computer program which was unusual or could not be easily categorized. The present invention overcomes these limitations by using data flow information generated specifically for the current computer program. For example, embodiments of the present invention use a feedback loop to the CPU simulator to generate actual data flow information associated with the specific computer program. These results are used to drive the optimization process iteratively until the most optimal binary is generated.

Naturally, the present invention is extremely useful in generating high performance benchmarks for a particular target processor. The techniques in the present invention are designed to tailor an application and specific data input values to a particular target processor using empirical data generated from a CPU simulator. Computer manufacturers and others using benchmarks can use the present invention to generate faster benchmarks and thus tout faster throughput times on their products.

While specific embodiments have been described herein for purposes of illustration, various modifications may be made without departing from the spirit and scope of the invention. Those skilled in the art understand that the present invention can be implemented in a wide variety of compiler and interpreter technologies and is not limited to computer systems executing the compilers used for the SPARC architecture. Alternative embodiments substantially similar to the preferred embodiment could be implemented except that the compilers are used to generate Java Bytecodes for the Java Virtual Machine, executables for the Java line of processors such as the PicoJava, NanoJava, MicroJava, and UltraJava architectures or the PowerPC processor available from Apple, Inc. of Cupertino, Calif., or any of the Pentium or x86 compatible processors available from the Intel Corporation or other corporations such as AMD, and Cyrix. Further, those skilled in the art understand that results generated by iteratively running a set of executable instructions through the CPU simulator could also be used for modifying the architectural subsystems in the processor such as memory, cache, specialized instructions, general purpose instructions. Furthermore, another alternative embodiment substantially similar to the preferred embodiment could be implemented except that the convergence on a particular optimization vector is limited by a predetermined number of feedback iterations rather than a predetermined threshold level. Accordingly, the invention is not limited to the above described embodiments, but instead is defined by the appended claims in light of their full scope of equivalents.

What is claimed is:

1. A method for using input data to optimize a computer program for execution on a target computer, the method comprising the steps of:

dividing the computer program into one or more logical units of code;

simulating execution of each logical unit using the input data;

generating a first optimization metric value and corresponding state information for each logical unit based upon the corresponding simulation;

optimizing the instructions within each logical unit according to the corresponding state information previously generated;

simulating execution of each optimized logical unit using the input data;

generating a second optimization metric value and corresponding state information for each logical unit based upon the corresponding simulation;

determining the difference between the first optimization metric value and the second optimization metric value and, if the difference is less than a predetermined threshold value, indicating that the optimization is complete, if the difference is greater than or equal to the predetermined threshold value, repeating the steps above except replace the computer program with the optimized computer program.

2. The method of claim 1 wherein the step of optimizing the instructions within each logical unit further comprises the steps of, performing one or more optimization transformations on the code in each logical unit;

adjusting the optimization metric to reflect changes in the code such as code removal or simplification of code logic;

determining the change in the optimization metric and, if the change in the optimization metric is greater than or equal to a predetermined threshold level, repeating the above steps except using the optimized logical unit in lieu of the logical unit, if the change in the optimization metric is less than the predetermined threshold level, indicating the logical unit is optimized.

3. The method of claim 2 wherein the optimization transformations on each logical unit includes invariance optimizations.

4. The method of claim 2 wherein the optimization transformations on each logical unit includes local code motion.

5. The method of claim 2 wherein the optimization transformations on each logical unit includes dead code removal optimizations.

6. The method of claim 1 wherein the computer program and input data is provided for processing before execution on the target computer.

7. The method of claim 1 wherein the logical units are basic blocks of instructions having only one entrance instruction and one exit instruction.

8. The method of claim 1 wherein the first and second optimization metric values for each logical unit includes a weighted product of the number of instructions executed in the basic block and the clock cycles per instruction (CPI) used to execute these instructions.

9. The method of claim 1 wherein the state information includes register usage information, dependencies between instructions, and external references to other computer programs.

10. A compiler having an optimizer which uses input data to optimize a computer program for execution on a target computer, comprising:

a division mechanism configured to divide the computer program into one or more logical units of code;

a simulation mechanism configured to simulate execution of instructions in each logical unit using the input data;

a first generation mechanism configured to generate a first optimization metric value and corresponding first state information for each logical unit based upon a corresponding simulation of each logical unit;

an optimization mechanism configured to optimize the instructions within each logical unit according to the corresponding first state information previously generated;

a second generation mechanism configured to generate a second optimization metric value and corresponding second state information for each optimized logical unit based upon a corresponding simulation of each optimized logical unit;

a comparison mechanism configured to compare the difference between the first optimization metric value and the second optimization metric value and, a first indicator mechanism coupled that the optimization is complete if the difference is less than a predetermined threshold value, or repeat the steps above except replace the computer program with the optimized computer program if the difference is greater than or equal to a predetermined threshold value.

11. The compiler of claim 10 wherein the mechanism configured to optimize the instructions within each logical unit further comprises, a mechanism configured to perform one or more optimization transformations on the code in each logical unit;

a mechanism configured to adjust the optimization metric to reflect changes in the code such as code removal or simplification of code logic;

a mechanism configured to determine the change in the optimization metric and, provide the optimized logical unit in lieu of the logical unit, if the change in the optimization metric is greater than or equal to a predetermined threshold level, or provide an indicator that the logical unit is optimized, if the change in the optimization metric is less than the predetermined threshold level.

12. The compiler of claim 11 wherein the optimization transformations on each logical unit includes invariance optimizations.

13. The compiler of claim 11 wherein the optimization transformations on each logical unit includes local code motion.

14. The compiler of claim 11 wherein the optimization transformations on each logical unit includes dead code removal optimizations.

15. The compiler of claim 10 wherein the computer program and input data is provided for processing before execution on the target computer.

16. The compiler of claim 10 wherein the logical units are basic blocks of instructions having only one entrance instruction and one exit instruction.

17. The compiler of claim 10 wherein the first and second optimization metric values for each logical unit includes a weighted product of the number of instructions executed in the basic block and the clock cycles per instruction (CPI) used to execute these instructions.

18. The compiler of claim 10 wherein the state information includes register usage information, dependencies between instructions, and external references to other computer programs.

19. A computer program product comprising:

a computer usable medium having computer readable code embodied therein which uses input data to optimize a computer program for execution on a target computer comprising:

a first code portion configured to divide the computer program into one or more logical units of code;

a second code portion configured to simulate execution of each logical unit using the input data;

a third code portion configured to generate a first optimization metric value and corresponding state information for each logical unit based upon the corresponding simulation;

a fourth code portion configured to optimize the instructions within each logical unit according to the corresponding state information previously generated;

a fifth code portion configured to simulate execution of each optimized logical unit using the input data;

a sixth code portion configured to generate a second optimization metric value and corresponding state information for each logical unit based upon the corresponding simulation;

a seventh code portion configured to determine the difference between the first optimization metric value and the second optimization metric value and, provide an indicator that the optimization is complete if the difference is less than a predetermined threshold value, or repeat the steps above except replace the computer program with the optimized computer program if the difference is greater than or equal to a predetermined threshold value.

20. The code in claim 19 further comprising:

a eighth code portion configured to perform one or more optimization transformations on the code in each logical unit;

a ninth code portion configured to adjust the optimization metric to reflect changes in the code such as code removal or simplification of code logic;

a tenth code portion configured to determine the change in the optimization metric and, provide a first indicator that the optimized logical unit should be used in lieu of the logical unit, if the change in the optimization metric is greater than or equal to a predetermined threshold level, or provide a second indicator that the logical unit is optimized, if the change in the optimization metric is less than the predetermined threshold level.

* * * * *